United States Patent
Mao

(10) Patent No.: US 10,711,427 B2
(45) Date of Patent: Jul. 14, 2020

(54) CAVITY-TYPE LOAD BOX

(71) Applicant: HANGZHOU OUGAN TECHNOLOGY CO., LTD., Hangzhou, Zhejiang (CN)

(72) Inventor: Yuxin Mao, Hangzhou (CN)

(73) Assignee: HANGZHOU OUGAN TECHNOLOGY CO., LTD., Hangzhou, Zhejiang (CN)

( * ) Notice: Subject to any disclaimer, the term of this patent is extended or adjusted under 35 U.S.C. 154(b) by 31 days.

(21) Appl. No.: 16/126,165

(22) Filed: Sep. 10, 2018

(65) Prior Publication Data
US 2020/0080275 A1    Mar. 12, 2020

(51) Int. Cl.
*E02D 33/00*    (2006.01)
*G01N 3/10*    (2006.01)

(52) U.S. Cl.
CPC .............. *E02D 33/00* (2013.01); *G01N 3/10* (2013.01)

(58) Field of Classification Search
CPC .................................. G01N 3/10; E02D 33/00
USPC ........................................................ 73/786
See application file for complete search history.

(56) References Cited

U.S. PATENT DOCUMENTS

| | | | | |
|---|---|---|---|---|
| 8,839,748 B2 * | 9/2014 | Kim | ............... | F01P 7/16 |
| | | | | 123/41.33 |
| 9,234,346 B2 * | 1/2016 | Sakamoto | ............... | E04H 9/021 |
| 2012/0294748 A1 * | 11/2012 | Shiibayashi | .......... | F04C 23/008 |
| | | | | 418/55.1 |
| 2018/0141109 A1 * | 5/2018 | Ploederl | .................... | B22C 7/06 |

FOREIGN PATENT DOCUMENTS

CN    2371650    *    3/2000
CN    201144899 Y    11/2008

* cited by examiner

*Primary Examiner* — Octavia Hollington
(74) *Attorney, Agent, or Firm* — Birch, Stewart, Kolasch & Birch, LLP

(57) ABSTRACT

A cavity-type load box includes an oil cavity unit. The oil cavity unit includes a sealing plate with a U-shaped section and two flat plates with edges wrapped in the sealing plate and is provided with an oil injection structure. Liquid oil injected from the oil injection structure flows into the oil cavity unit. The edges of the two flat plates are wrapped in the sealing plate with the U-shaped section, so that after the liquid oil enters an oil cavity via the oil injection structure, the sealing plate is stretched under the pressure of the liquid oil to cause deformation of the oil cavity. As a stress required for deformation of the sealing plate is very small, the pressure generated by the liquid oil directly acts on an object on the upper or lower surface of the cavity-type load box, and accordingly, the object s pushed.

8 Claims, 3 Drawing Sheets

CAVITY-TYPE LOAD BOX

TECHNICAL FIELD

The invention relates to the field of cavity-type load boxes, in particular to a load box easier to deform.

DESCRIPTION OF RELATED ART

Nowadays, load devices are used for testing the compressive resistance particularly of foundation piles of buildings. At present, loads are generally loaded by hydraulic cylinders. However, traditional hydraulic cylinders are complex in structure and difficult to transport. Chinese Invention Patent Application No. 2008200820886 provides a load box, which is simple in structure and easy to transport and is provided with a plurality of oil cavity units communicated with one another and formed by metal sheets through welding, wherein liquid oil is injected into the oil cavity units and squeezes the oil cavity units to deform, so that the pressure of the hydraulic oil is applied to a to-be-tested foundation pile. However, such load box has an unsatisfactory deformation effect and is prone to being damaged, and particularly, weld points are likely to be damaged by a tensile force generated by two metal sheets connected with each other.

BRIEF SUMMARY OF THE INVENTION

To overcome the defects of the prior art, the invention provides a cavity-type load box with a good deformation effect.

To fulfill the above objective, the invention provides the following technical scheme: A cavity-type load box comprises an oil cavity unit. The oil cavity unit comprises a sealing plate and two flat plates with edges wrapped in the sealing plate. The sealing plate has a U-shaped section. The oil cavity unit is provided with an oil injection structure. Liquid oil injected from the oil injection structure flows into the oil cavity unit. Herein, a top flat plate refers to the uppermost flat plate. According to the cavity-type load box, the edges of the two flat plates are wrapped in the sealing plate with the U-shaped section, so that after the liquid oil enters an oil cavity via the oil injection structure, the sealing plate is stretched under the pressure of the liquid oil to cause deformation of the oil cavity; and as a stress required for deformation of the sealing plate is very small, the pressure generated by the liquid oil directly acts on an object on the upper or lower surface of the cavity-type load box, and accordingly, the object on the upper or lower surface of the cavity-type load box is pushed. In this application, the sealing plate is a thin metal plate with good ductility.

Furthermore, the oil injection structure comprises an upper cover plate and oil holes, wherein the oil holes are formed in the upper cover plate and the top flat plate and are communicated with the oil cavity unit.

Furthermore, the cavity-type load box is provided with a plurality of oil cavity units, wherein a transition block is arranged between every two adjacent oil cavity units, and every two adjacent oil cavity units are connected through the corresponding transition block. The transition blocks and the oil cavity units are provided with oil holes through which the oil cavity units are communicated with one another. Liquid oil injected from the oil injection structure reaches oil cavities of the oil cavity units via the oil holes.

Furthermore, a lower cover plate is arranged on the bottom flat plate and is provided with an oil hole.

Furthermore, the upper flat plate and the lower flat plate of the topmost oil cavity unit are respectively welded onto the upper cover plate and the corresponding transition block. The upper flat plate of the bottommost oil cavity unit is welded onto the corresponding transition block, and the lower flat plate of the bottommost flat plate is not provided with a hole or is welded onto the lower cover plate.

Furthermore, the cavity-type load box is provided with at least three oil cavity units, wherein the upper flat plate and the lower flat plate of the oil cavity unit between the topmost oil cavity unit and the bottommost oil cavity unit are respectively welded onto the adjacent transition blocks, so that the intervals between oil cavities of the oil cavity units, between the upper cover plate and the corresponding transition block, between the transition blocks as well as between the corresponding transition block and the lower cover plate correspond with one another, thus, when the sealing plates on the edges of the oil cavity units extend and deform, the intervals between the upper cover plate and the corresponding transition block, between the transition blocks as well as between the corresponding transition block and the lower cover plate are increased accordingly, pressures for generating the same deformation at all positions, in the height direction, of the oil cavity units are identical, a uniform pressure is applied by the cavity-type load box to the to-be-tested object in the height direction, and accordingly, measurement accuracy is further ensured.

Furthermore, the cavity-type load box is provided with four oil cavity units, wherein the upper flat plate of the first oil cavity unit is welded onto the upper cover plate, and the lower flat plate of the first oil cavity unit is welded onto a first transition block; the upper flat plate of the second oil cavity unit is welded onto the first transition block, and the lower flat plate of the second oil cavity unit is welded onto a second transition block; the upper flat plate of the third oil cavity unit is welded onto the second transition block, and the lower flat plate of the third oil cavity is welded onto a third transition block; and the upper flat plate of the fourth oil cavity unit is welded onto the third transition block, and the lower flat plate of the fourth oil cavity unit is welded onto the lower cover plate.

Furthermore, each transition block has an inverted-T-shaped section. The upper flat plate of each oil cavity unit is welded onto the bottom surface of the corresponding transition block or a bottom surface of the upper cover plate. The lower flat plate of each oil cavity unit is welded onto a step of the corresponding T-shaped transition block or an upper end face of the lower cover plate or is not provided with a hole. As the section of the transition blocks is in the T shape, welding is facilitated. Through this configuration at the weld position, weld points are prevented from being directly compressed.

Furthermore, a middle through hole for facilitating concrete floating is formed in the middle of each flat plate, and the edge of the middle through hole of each flat plate is provided with the corresponding sealing plate with the U-shaped section. Each oil cavity is annular.

Furthermore, the flat plates and the sealing plates are welded together, and the flat plates and the transition blocks are also welded together; the lower cover plate is provided with an oil hole, and threads are arranged on walls of the oil holes in the upper cover plate and the lower cover plate; the flat plates are circular; at least two oil injection structures are arranged, and a connecting line between the two oil injection structure passes through the center of the cavity-type load box.

In the figures: 1, flat plate; 2, sealing plate; 3, oil hole; 4, upper cover plate; 5, lower cover plate; 6, transition block; 7, middle through hole.

DETAILED DESCRIPTION OF THE INVENTION

Figure 1:
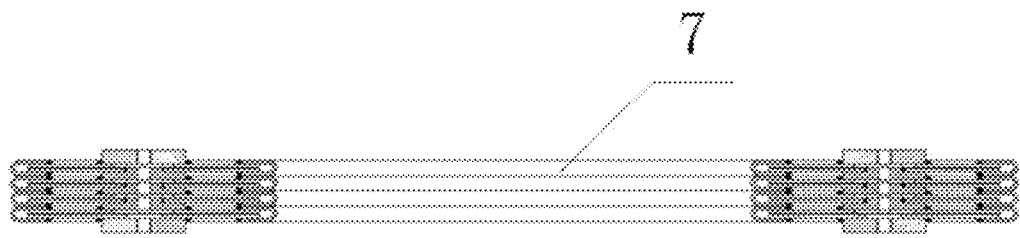
FIG. 1 is a sectional view of the cavity-type load box of the invention.
Figure 2:
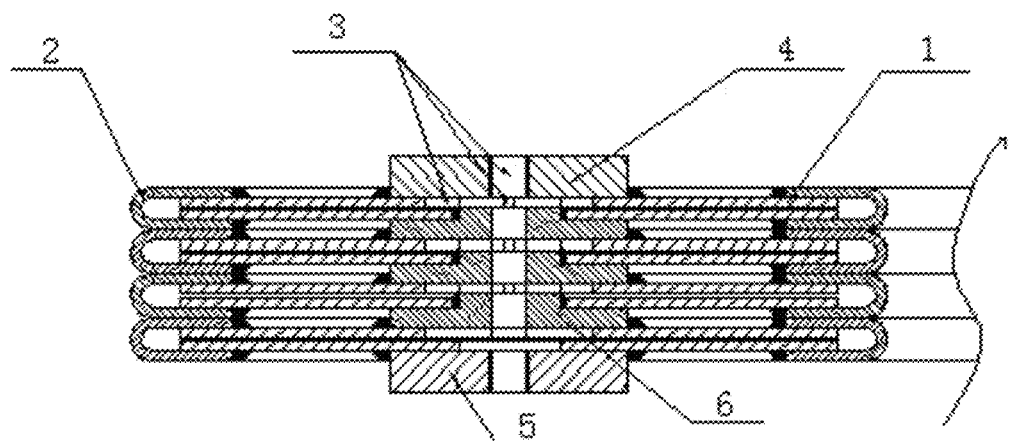
FIG. 2 is a partial sectional view of the cavity-type load box of the invention.
Figure 3:
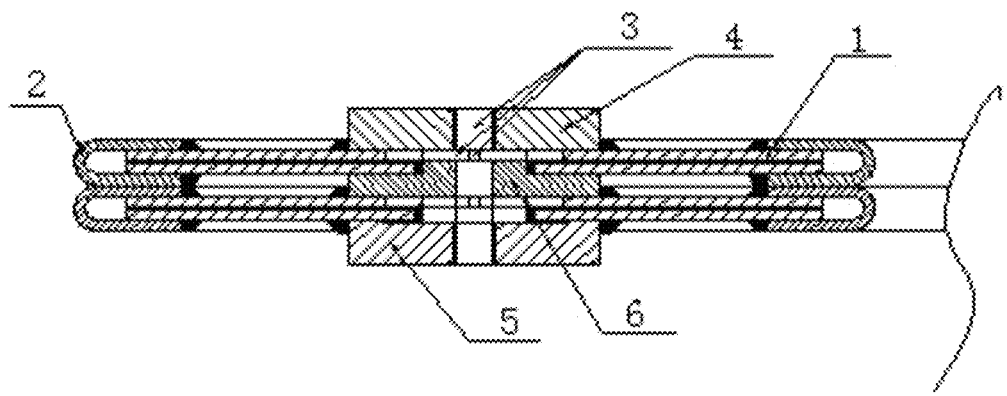
FIG. 3 is a partial sectional view of the cavity-type load box provided with two oil cavity units of the invention.
Figure 4:
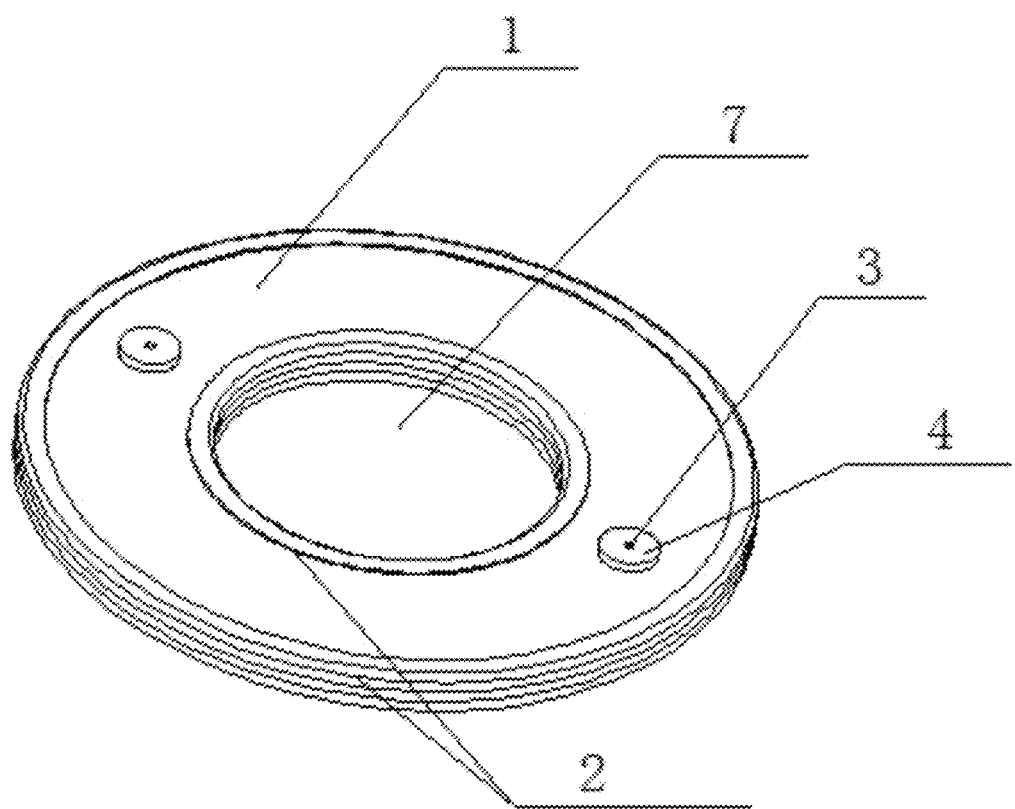
FIG. 4 is a structural view of the cavity-type load box of the invention.
Figure 5:
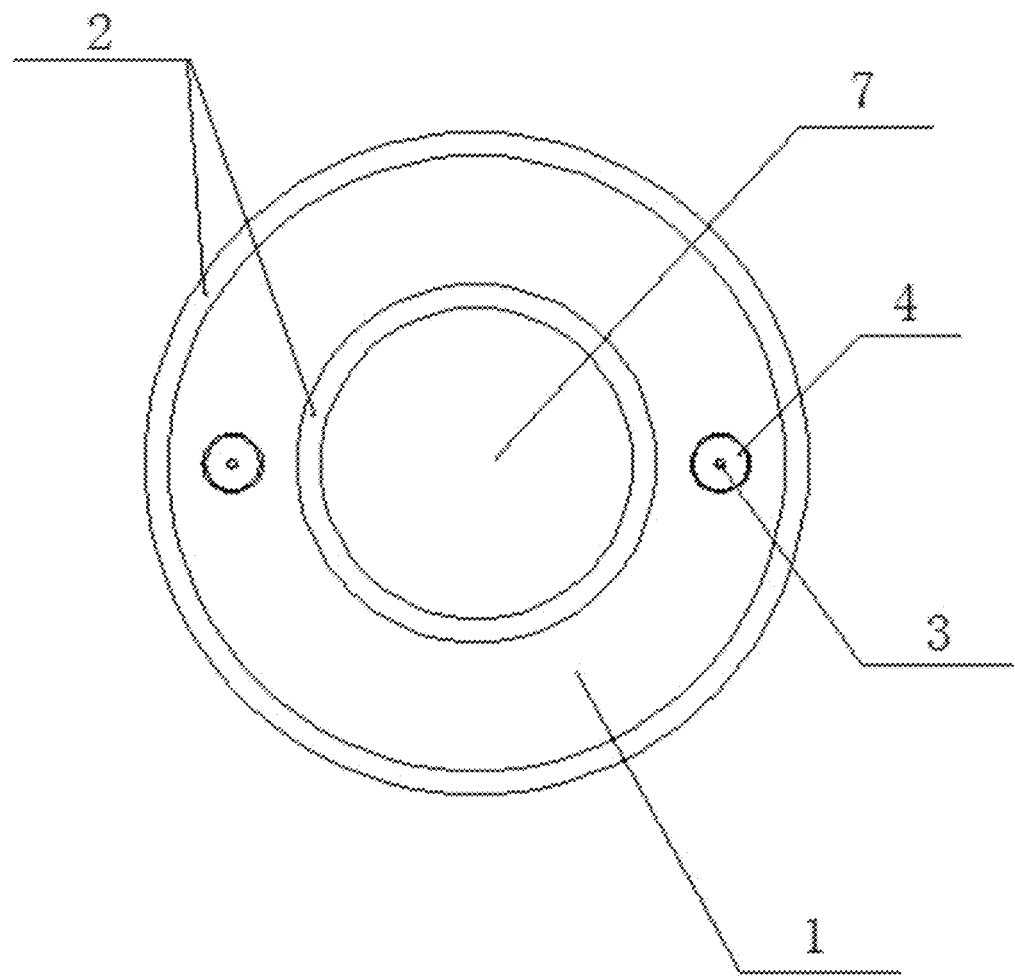
FIG. 5 is a front view of the cavity-type load box of the invention.
Figure 6:
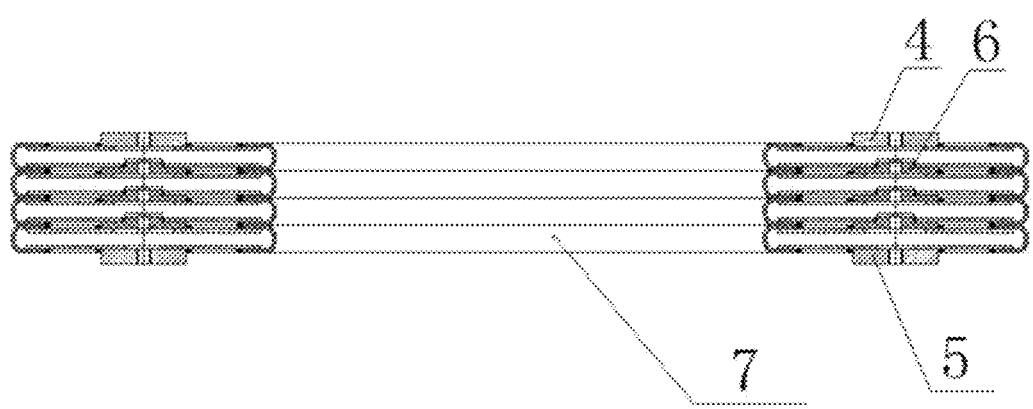
FIG. 6 is a sectional view of the cavity-type load box after deformation of the invention.

Embodiments of the cavity-type load box of the invention are further described as follows in combination with FIGS. 1-3.

To overcome the defects of the prior art, the invention provides a cavity-type load box with a good deformation effect.

The cavity-type load box comprises an oil cavity unit. The oil cavity unit comprises a sealing plate 2 and two flat plates 1 with edges wrapped in the sealing plate 2. The sealing plate 2 has a U-shaped section. The oil cavity unit is provided with an oil injection structure, and liquid oil injected from the oil injection structure flows into the oil cavity unit. The oil cavity unit mentioned herein refers to the uppermost oil cavity unit. According to the cavity-type load box, the edges of the two flat plates 1 are wrapped in the sealing plate 2 with the U-shaped section; after the liquid oil enters an oil cavity via the oil injection structure, the sealing plate 2 is stretched to cause deformation of the oil cavity; as a stress required for deformation of the sealing plate 2 is very small, the pressure generated by the liquid oil directly acts on an object on the upper or lower surface of the cavity-type load box, and accordingly, the object on the upper or lower surface of the cavity-type load box is pushed.

Furthermore, the oil injection structure comprises an upper cover plate 4 and oil holes 3. The oil holes 3 are formed in the upper cover plate 4 and the top flat plate 1 and are communicated with the oil cavity unit. The top flat plate 1 herein refers to the upper flat plate 1 of the uppermost oil cavity unit.

Furthermore, the cavity-type load box is provided with a plurality of oil cavity units, wherein a transition block 6 is arranged between every two adjacent oil cavity units, and every two adjacent oil cavity units are connected through the corresponding transition block 6. The transition blocks 6 and the oil cavity units are provided with oil holes 3 through which the oil cavity units are communicated with one another. Liquid oil injected from the oil injection structure reaches the oil cavities of the oil cavity units via the oil holes 3.

Furthermore, a lower cover plate 5 is arranged on the bottom flat plate 1 and is provided with an oil hole 3.

Furthermore, the upper flat plate 1 and the lower flat plate 1 of the topmost oil cavity unit are respectively welded onto the upper cover plate 4 and the corresponding transition block 6. The upper flat plate 1 of the bottommost oil cavity unit is welded onto the corresponding transition block 6, and the lower flat plate 1 of the bottommost oil cavity unit is not provided with a hole or is welded onto the lower cover plate 5. Herein, the lower flat plate of the bottommost oil cavity unit is not provided with a hole and directly seals the oil cavities at the bottom. Or, the lower flat plate of the bottommost oil cavity unit is provided with an oil hole and is welded onto the lower cover plate, so that oil drainage of the oil cavity units is facilitated.

Furthermore, the cavity-type load box is provided with at least three oil cavity units, wherein the upper flat plate 1 and the lower flat plate 1 of the oil cavity unit between the topmost oil cavity unit and the bottommost oil cavity unit are respectively welded onto the adjacent transition blocks 6. Through this configuration, the intervals between the oil cavities of the oil cavity units, between the upper cover plate 4 and the corresponding transition block 6, between the transition blocks 6 as well as between the corresponding transition block 6 and the lower cover plate 5 correspond with one another, so that when the sealing plates 2 on the edges of the oil cavity units extend and deform, the intervals between the upper cover plate 4 and the corresponding transition block 6, between the transition blocks 6 as well as between the corresponding transition block 6 and the lower cover plate 5 are increased accordingly, thus, a uniform pressure is applied by the cavity-type load box to the to-be-tested object in the height direction, and accordingly, measurement accuracy is further ensured. The oil cavities are vertically stacked and thus can be conveniently welded.

If the cavity-type load box is provided with two oil cavity units, the upper flat plate 1 of the first oil cavity unit is welded onto the upper cover plate 4, and the lower flat plate 1 of the first oil cavity unit is welded onto a first transition block 6; the upper flat plate 1 of the second oil cavity unit is welded onto the first transition block 6, and the lower flat plate 1 of the second oil cavity unit is not provided with a hole or is welded onto the lower cover plate 5. If the cavity-type load box is provided with three oil cavity units, the upper flat plate 1 of the first oil cavity unit is welded onto the upper cover plate 4, and the lower flat plate 1 of the first oil cavity unit is welded onto a first transition block 6; the upper flat plate 1 of the second oil cavity unit is welded onto the first transition block 6, and the lower flat plate 1 of the second oil cavity unit is welded onto a second transition block 6; and the upper flat plate 1 of the third oil cavity unit is welded onto the second transition block 6, and the lower flat plate 1 of the third oil cavity unit is not provided with a hole or is welded onto the lower cover plate 5, by analogy.

Furthermore, the cavity-type load box is provided with four oil cavity units, wherein the upper flat plate 1 of the first oil cavity unit is welded onto the upper cover plate 4, and the lower flat plate 1 of the first oil cavity unit is welded onto a first transition block 6; the upper flat plate 1 of the second oil cavity unit is welded onto the first transition block 6, and the lower flat plate 1 of the second oil cavity unit is welded onto a second transition block 6; the upper flat plate 1 of the third oil cavity unit is welded onto the second transition block 6, and the lower flat plate 1 of the third oil cavity unit is welded onto a third transition block 6; and an upper flat plate 1 of the fourth oil cavity unit is welded onto the third transition block 6, and the lower flat plate 1 of the fourth oil cavity unit is sealed or is welded onto the lower cover plate 5.

Furthermore, each transition block 6 has an inverted-T-shaped section. The upper flat plate 1 of each oil cavity unit is welded onto a bottom surface of the corresponding transition block 6 or the upper cover plate 4, and the lower flat plate 1 of each oil cavity unit is welded onto a step of the corresponding T-shaped transition block 6 or an upper end face of the lower cover plate 5 or is not provided with a hole, thus, facilitating welding.

Furthermore, a middle through hole 7 for facilitating concrete floating is formed in the middle of each flat plate 1. The edge of the middle through hole of each flat plate 1 is provided with the corresponding sealing plate 2 with the U-shaped section. Each oil cavity is annular.

Furthermore, the flat plates 1 and the sealing plates 2 are welded together, and the flat plates 1 and the transition blocks 6 are also welded together. The lower cover plate is provided with an oil hole 3. Threads are arranged on walls of the oil holes 3 on the upper cover plate and the lower cover plate. The flat plates 1 are circular. At least two oil injection structures are arranged, and a connecting line between the two oil injection structures passes through the center of the cavity-type load box.

In this patent, the upper flat plate 1 and the lower flat plate 1 respectively refer to the flat plate 1 located above and the flat plate 1 located below of each oil cavity unit; and the top flat plate 1 and the bottom flat plate 1 respectively refer to the uppermost flat plate 1 and the lowermost flat plate 1 of the cavity-type load box.

The embodiments described above are only preferred ones of the invention, but the protection scope of the invention is by no means limited to the above embodiments. All technical schemes based on the conception of the invention should fall within the protection scope of the invention. What should be noted is that various improvements and embellishments made by those ordinarily skilled in this technical field without deviating from the principle of the invention should also fall within the protection scope of the invention.

The invention claimed is:

1. A cavity-type load box, comprising an oil cavity unit, wherein the oil cavity unit comprises a sealing plate (2) and two flat plates (1) with edges wrapped in the sealing plate, the sealing plate has a U-shaped section, the oil cavity unit is provided with an oil injection structure, and liquid oil injected from the oil injection structures flows into the oil cavity unit,
wherein the oil injection structure comprises an upper cover plate (4) and oil holes (3), and the oil holes are formed in the upper cover plate and a top flat plate and are communicated with the oil cavity unit, and
wherein the cavity-type load box is provided with a plurality of said oil cavity units, a transition block (6) is arranged between every two adjacent said oil cavity units, every two adjacent said oil cavity units are connected through the corresponding transition block, the transition blocks and the oil cavity units are provided with oil holes through which the oil cavity units are communicated with one another, and the liquid oil injected from the oil injection structure reaches oil cavities of the oil cavity units.

2. The cavity-type load box according to claim 1, wherein an upper flat plate of a topmost one of the oil cavity units is welded onto the upper cover plate, and a lower flat plate of the topmost one of the oil cavity units is welded onto the transition block adjacent to the upper cover plate; and an upper flat plate of a bottommost one of the oil cavity units is welded onto the transition block adjacent to a lower cover plate, and a lower flat plate of the bottommost one of the oil cavity units is not provided with a hole.

3. The cavity-type load box according to claim 1, wherein a lower cover plate is arranged on a bottom flat plate and is provided with an oil hole, and the bottom flat plate and the lower cover plate are both provided with oil holes; an upper flat plate of a topmost one of the oil cavity units is welded onto the upper cover plate, and a lower flat plate of the topmost one of the oil cavity units is welded onto the transition block adjacent to the upper cover plate; and an upper flat plate of a bottommost one of the oil cavity units is welded onto the transition block adjacent to the lower cover plate, and a lower flat plate of the bottommost one of the oil cavity units is welded onto the lower cover plate.

4. The cavity-type load box according to claim 3, wherein the cavity-type load box is provided with at least three said oil cavity units, an upper flat plate and a lower flat plate of one of the oil cavity units between the topmost one of the oil cavity units and the bottommost one of the oil cavity units are respectively, welded onto the two corresponding adjacent transition blocks.

5. The cavity-type load box according to claim 1, wherein the cavity-type load box is provided with four said oil cavity units, an upper flat plate of the first oil cavity unit is welded onto the upper cover plate, and a lower flat plate of the first oil cavity unit is welded onto a first transition block; and an upper flat plate of the second oil cavity unit is welded onto the first transition block, and a lower flat plate of the second oil cavity unit is welded onto a second transition block; an upper flat plate of the third oil cavity unit is welded onto the second transition block, and a lower flat plate of the third oil cavity unit is welded onto a third transition block; and an upper flat plate of the fourth oil cavity unit is welded onto the third transition block, and a lower flat plate of the fourth oil cavity unit is welded onto a lower cover plate.

6. The cavity-type load box according to claim 5, wherein each said transition block has an inverted-T-shaped section, the upper flat plate of each said oil cavity unit is welded onto a bottom surface of the corresponding transition block or a bottom surface of the upper cover plate, and the lower flat plate of each said oil cavity unit is welded onto a step of the corresponding T-shaped transition block or an upper end face of the lower cover plate.

7. The cavity-type load box according to claim 5, wherein a middle through hole (7) for facilitating concrete floating is formed in a middle of each said flat plate, an edge of the middle through hole of each said flat plate is provided with the corresponding sealing plate with the U-shaped section, and each said oil cavity is annular.

8. The cavity-type load box according to claim 7, wherein the flat plates and the sealing plates are welded together, and the flat plates and the transition blocks are also welded together; the lower cover plate is provided with an oil hole, and threads are arranged on walls of the oil holes in the upper cover plate and the lower cover plate; the flat plates are circular; at least two said oil injection structures are arranged, and a connecting line between the two oil injection structure passes through a center of the cavity-type load box.

* * * * *